United States Patent
Cheng et al.

(10) Patent No.: US 7,154,909 B2
(45) Date of Patent: Dec. 26, 2006

(54) APPARATUS, AND ASSOCIATED METHOD, FOR FACILITATING MAINTENANCE OF SENSITIVITY LEVEL OF DATA COMMUNICATED IN A PACKET COMMUNICATION SYSTEM

(75) Inventors: Mark W. Cheng, San Diego, CA (US); Keith Miller, Plano, TX (US)

(73) Assignee: Nokia Corporation, Espoo (FI)

( * ) Notice: Subject to any disclaimer, the term of this patent is extended or adjusted under 35 U.S.C. 154(b) by 998 days.

(21) Appl. No.: 10/167,908

(22) Filed: Jun. 12, 2002

(65) Prior Publication Data

US 2003/0035441 A1    Feb. 20, 2003

Related U.S. Application Data

(60) Provisional application No. 60/298,748, filed on Jun. 15, 2001.

(51) Int. Cl.
*H04J 3/16* (2006.01)
*H04B 7/216* (2006.01)

(52) U.S. Cl. ............. 370/466; 370/342; 370/474
(58) Field of Classification Search ............ None
See application file for complete search history.

(56) References Cited

U.S. PATENT DOCUMENTS

| 6,057,943 | A | 5/2000 | Kweon et al. | |
|---|---|---|---|---|
| 6,111,866 | A | 8/2000 | Kweon et al. | |
| 6,208,620 | B1 | 3/2001 | Sen et al. | |
| 6,259,684 | B1 | 7/2001 | Fong et al. | |
| 2003/0185239 | A1* | 10/2003 | Miller et al. | 370/474 |
| 2004/0039833 | A1* | 2/2004 | Ludwig et al. | 709/230 |

OTHER PUBLICATIONS

International Search Report for PCT/US02/19134.

* cited by examiner

*Primary Examiner*—Duc Ho
(74) *Attorney, Agent, or Firm*—Alston & Bird LLP (57) ABSTRACT

Apparatus, and an associated method, for providing a radio link layer control procedure to maintain the sensitivity of UDP-Lite-formatted data at an RLP (Radio Link Protocol), or other, layer. An indicator generator generates an indication of the sensitivity-type of data that is formatted at the RLP layer. An RLP packet is generated, including the sensitivity data indicator value, and sent to a receiving station. When received thereat, the value of the sensitivity data indicator is utilized and subsequent actions, whether to permit retransmission of the data in the event of erroneous-, or non-, delivery is made.

20 Claims, 4 Drawing Sheets

APPARATUS, AND ASSOCIATED METHOD, FOR FACILITATING MAINTENANCE OF SENSITIVITY LEVEL OF DATA COMMUNICATED IN A PACKET COMMUNICATION SYSTEM

CROSS-REFERENCE TO RELATED APPLICATION

The present invention claims the priority of provisional patent application, Ser. No. 60/298,748, filed on Jun. 15, 2001, the contents of which are incorporated by reference herein.

The present invention relates generally to a manner by which to facilitate communication of packet-formatted data, such as UDP (User Datagram Protocol) Lite-formatted data that selectably includes a sensitive part and a nonsensitive part of information data. More particularly, the present invention relates to apparatus, and an associated method, by which to effectuate a radio link layer control procedure to maintain the sensitivity of the UDP-Lite-formatted, or other, data at the radio link layer. Improved communications between sending and receiving stations are provided as the frame quality of data frames sent at the radio link layer is improved, without increasing time delay in the time required to communicate the data to effectuate the communications.

BACKGROUND OF THE INVENTION

The need for, and use of, communication systems to communicate therethrough has become an endemic and necessary, part of modern society.

As a result of advancements in communication technologies, new types of communication systems, as well as improvements to existing communication systems have been permitted. Amongst the advancements in communication technologies are advancements in digital communication techniques. When digital communication techniques are used, data that is to be communicated is digitized. And, the digitized data, so-formed, is formatted in a selected manner, prior to communication thereof. Formatting of the digital data typically includes packetizing the data into data packets.

Generally, standardized protocols are utilized by which to format the data into packets. Communication devices that are constructed to be operable pursuant to send or to receive data formatted pursuant to a particular protocol are able, as appropriate, to send or to receive such data as long as the data is formatted according to the appropriate protocol.

More than one formatting protocol is sometimes used when communicating data. That is to say, multiple levels, or layers, of formatting of the digitized data are sometimes provided. A communication device, used to communicate data can be represented in logical-layer form. Such a representation including layers at which formatting is applied to, or removed from, digitized data.

A user datagram protocol (UDP), or UDP protocol, is an exemplary protocol scheme that is widely utilized. UDP-formatted data is regularly communicated, for instance, in the effectuation of real-time communication services. Conventional UDP-formatting of data advantageously provides for sending-station-specified data rates. And, data packets delivered to a receiving station are delivered immediately to a receiving application irrespective of their order of arrival. In conventional UDP formatting, a checksum is used to verify UDP header and payload to data parts, thereby to effectuate validation of received data packets. Conventional UDP checksum protection provides protection for an entire payload portion of a UDP-formatted data packet or for none of the payload portion of the data packet.

Increasingly, radio communication systems utilize packet communication schemes in which packetized data is communicated upon an error prone air interface. A modified UDP formatting scheme, referred to as UDP-Lite, is sometimes utilized. UDP-Lite formatting is compatible with conventional, UDP formatting. But, UDP-Lite formatting provides improved functionality and flexibility, beneficial attributes for communications in a radio environment.

Various aspects of a UDP-Lite-formatted data packet differ with those of a conventional, UDP-formatted packet. For instance, the UDP length and checksum is replaced with a partial coverage length and partial checksum. Thereby, the data contained in the UDP-Lite data packet is separated into sensitive and nonsensitive sections. Pursuant to checksum calculations, when an error is detected in the sensitive part, the data packet is discarded. However, errors contained in the nonsensitive part of the data packet do not cause the data packet to be discarded. Instead, the data packet is forwarded for further processing of the data irrespective of whether the nonsensitive part contains errors.

While the UDP-Lite formatting advantageously forms sensitive and nonsensitive parts, if a lower-level layer, i.e., a layer beneath the UDP-Lite layer, fails to maintain the segregation between such parts, the advantages of such segregation are not provided.

While existing proposals have been set forth to maintain the segregation between the sensitive and nonsensitive parts of the UDP-Lite-formatted data packet, such existing proposals are relatively complex. And, such complexity is disadvantageous.

Generally, the UDP-Lite concept of insensitive data must be introduced to underlying layers so that the data is not subsequently checked for errors and discarded for containing errors.

Radio link protocol (RLP), is a lower-layer protocol used with a, e.g., cdma2000 traffic channel to support CDMA data services in a cdma2000 cellular, communication system. The RLP carries retransmission and re-sequencing procedures to reduce the frame error rate (FER) exhibited by a CDMA traffic channel. But, when formatting data pursuant to RLP, if the sensitivity of the UDP-Lite formatting is not maintained, the speed advantages provided by the nonsensitive part of the UDP-Lite-formatted data packet is not maintained. Other lower-layer formatting protocols also fail.

Therefore, a manner is required by which to maintain the sensitivity level of the UDP-Lite-formatted data when the data is subsequently formatted with a lower-level formatting protocol.

It is in light of this background information related to packet-based communications that the significant improvements of the present invention have evolved.

SUMMARY OF THE INVENTION

The present invention, accordingly, advantageously provides apparatus, and an associated method, by which to facilitate communication of packet-formatted data, such as UDP (User Datagram Protocol) Lite-formatted data, or other higher-layer formatting, that selectably includes a sensitive part and a nonsensitive part of information data.

Through operation of an embodiment of the present invention, a manner is provided by which to effectuate a radio link layer control procedure to maintain the sensitivity of the UDP-Lite-formatted, or other, data at a radio link layer. Because the sensitivity of the UDP-Lite-formatted data is maintained subsequent to additional formatting at a layer beneath the UDP-Lite-layer, the advantages provided by segregating the data into the sensitive and nonsensitive parts at the UDP-Lite-layer are maintained. Improved communications are provided as the frame quality of data frames sent at the radio link layer is improved, without increasing time delay in the time required to communicate the data to effectuate the communications.

In one aspect of the present invention, a radio link layer control procedure is provided for a radio link protocol (RLP), or other appropriate lower-level layer, by which to protect a sensitive part of data provided to the lower-level layer while also avoiding retransmission and discarding of the sensitive part of the data.

UDP Lite-formatted data is provided to a radio link layer, such as the RLP layer. Once delivered thereto, determination is made of which parts of the data are sensitive and insensitive. The determinations are made, e.g., by determining by use of indicia contained in the UDP-Lite header portion of the UDP-Lite-formatted data provided thereto. The RLP layer then segments the sensitive and insensitive parts of the UDP-Lite-formatted data into separate data frames. The frame-type of the data frame, i.e., the content-type of the data contained in such frames, so-formed, indicates the content thereof.

The RLP-formatted, data frame is communicated to a receiving station. Once received at the receiving station, the indicia identifying the content-type of the data packet is used at the receiving station to determine what type of data is contained in the data packet received thereat. The value of such indicia is utilized to determine whether to permit retransmission or re-sequencing of the data. A non-transparent procedure is provided for sensitive data and a semi-transparent procedure is provided for insensitive data.

In another aspect of the present invention, a sensitive data indicator field is provided for the header part of a lower-layer-formed data packet to which the UDP-Lite-formatted data packet is provided. The sensitive data indicator field is populated with a value indicating the content-type of the data formatted into the lower-layer data packet. When the resultant data packet is communicated to a receiving station, the receiving station identifies the value of the sensitive data indicator field. And, responsive to the value of the field, retransmission of the data packet is selectively permitted. The header part of the lower-layer-formatted data selectably further includes a field, a SEG_MAP_COUNT field. The field is populated with a value corresponding to the number of data frames that are split from a single UDP-Lite-formatted data packet.

The header part of the lower-layer-formatted data packet also includes a FIRST field that is populated with values identifying the first frame sequence number of the UDP-Lite-formatted packet. And, the lower-layer-formatted data packet also includes an SDI_MAP field, populated with values identifying a bit map indexing the sensitivity of each data frame.

When the data frame is received with insufficient quality or missing at a receiving station, decisions are made as to whether to request retransmission of the data packet. Separate transparent and non-transparent procedures are selected to be carried out. And more particularly, a semi-transparent procedure is carried out when the data frame received with insufficient quality or missing at the receiving station contains insensitive data. Retransmission of the insensitive data is permitted when not all of the sensitive data is received. Thereby, retransmission is provided for, but only during times in which sensitive data is still being transmitted to the receiving station. No additional delay periods are imposed. But, improved frame quality results due to the selected retransmission of the insensitive data pursuant to the semi-transparent procedure.

In these and other aspects, therefore, apparatus, and an associated method, is provided for a packet communication system. The packet communication system has a first formatting layer operable pursuant to a first protocol and a second formatting layer operable pursuant to a second protocol. The first formatting layer formats data selectably into a first part and a second part. The second formatting layer formats the data, subsequent to formatting thereof by the first formatting layer. Identification at the second formatting layer of the formatting performed at the first formatting layer is facilitated. An indicator generator is operable at the second formatting layer for generating an indicator. The indicator is of a value representative of whether the data provided thereto, to be formatted at the second formatting layer pursuant to the second protocol, is formatted into the first part and the second part. The indicator generated at the indicator generator forms part of a second-layer data packet formed at the second formatting layer.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
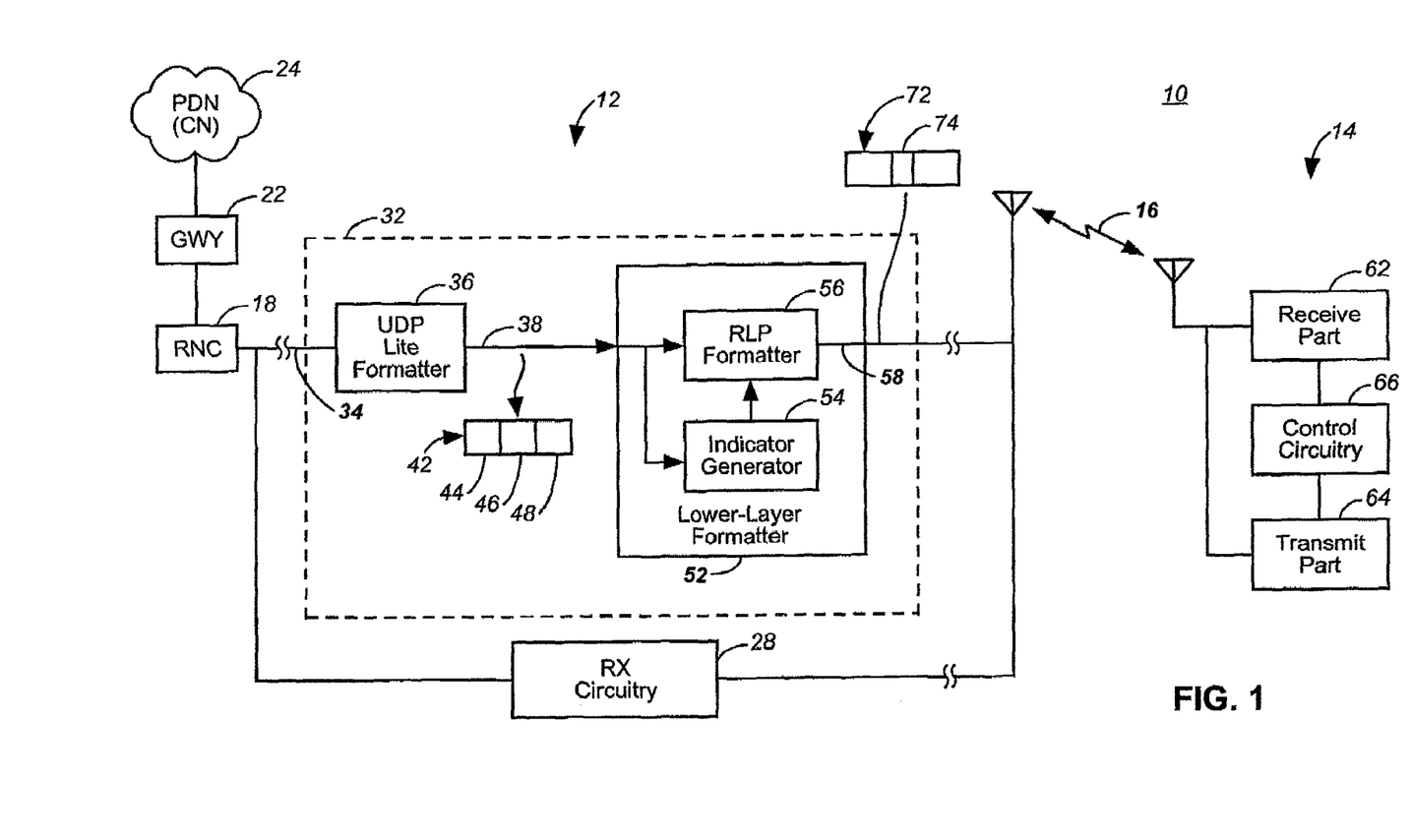
FIG. 1 illustrates a functional block diagram of a communication system in which an embodiment of the present invention is operable.

Referring first to FIG. 1, a communication system, shown generally at 10, operates to communicate packet-formatted data between communication stations of a communication system. Here, a first communication station forms a base transceiver station (BTS) 12, and a second communication station forms a mobile station 14. Communications are effectuated between the base transceiver station and the mobile station by way of radio channels defined upon a radio link, designated by the arrow 16, representative of an air interface.

In the exemplary implementation, the communication system 10 forms a cellular communication system operable pursuant to a cdma2000 operational specification. It should be noted at the outset, however, that the communication system 10 shown in the Figure, and the operation thereof is similarly also representative of other types of packet communication systems, both packet radio communication systems and wireline communication systems.

The base transceiver station forms a portion of a radio access network (RAN). The radio access network also includes a radio network controller (RNC) 18. And, in turn, the radio network controller is coupled to a gateway (GWY) 22. The gateway is coupled to a packet data network (PDN) 24 forming a core network (CN) of the communication system. Communication devices are, in turn, coupled to the packet data network. Such communication devices are capable of communication, by way of the packet data network and radio access network, to communicate with the mobile station by way of appropriate allocation of channel bandwidth on the radio link 16.

The base transceiver station forms a radio transceiver having a transmit part and receive part. The receive part is here represented by a receive circuitry 28 operable to operate upon data communicated to the base transceiver station by way of the radio link 16 and detected at the base transceiver station. And, the transmit part, in addition to conventional transmit circuitry (not shown) includes a formatter 32 operable pursuant to an embodiment of the present invention. The formatter is coupled to receive, here by way of the lines 34, data that is to be communicated to the mobile station 14.

A first functional element of the formatter 32, and to which the data generated on the line 34 is first applied, is a UDP (User Datagram Protocol) Lite formatter 36. The UDP-Lite formatter operates to format the data provided thereto into UDP-Lite-formatted data packets on the line 38. As described more fully above, the formatting of a UDP-Lite-formatted, data packet, selectably includes both a sensitive part and a nonsensitive part of information data. An exemplary UDP-Lite-formatted data packet 42 is shown in the Figure, here shown to include a header portion 44 and payload portions 46 and 48 representative of the sensitive and nonsensitive parts.

The UDP-formatted data packets generated by the formatter 36 are provided to a lower-layer formatter 52. In the exemplary implementation in which the communication system operates pursuant to the cdma2000 operational specification, the lower-layer formatter 52 operates pursuant to the RLP (Radio Link Protocol). In other implantations, other lower-layer-formatting protocols are utilized. For instance, in a W-CDMA (Wideband Code Division Multiple Access) communication system, RLC formatting is instead utilized.

The lower-layer formatter 52 is operable pursuant to an embodiment of the present invention to maintain the sensitivity of the data provided thereto. That is to say, in contrast to existing lower-layer formatting of convention systems, the lower-layer formatter 52 re-segments, or otherwise maintains the sensitivity of the UDP-Lite-formatted data. And, here, the formatter is shown to include an indicator generator 54 and an RLP formatter 56. The indicator generator operates to generate an indicator value representative of the data-type of the data provided to the formatter on the line 38. That is to say, the indicator generator generates an indicator of a first value when the data forms the sensitive data-part of the UDP-Lite-formatted data. And, the indicator generator value is of a second value when the data provided to the formatter 52 is nonsensitive data.

At the lower-layer formatter, determinations are made of the sensitive and insensitive data parts of the UDP-Lite-formatted data packet provided thereto on the line 38. Determinations are made through analysis of the header part 44 of the UDP-Lite data packet. The RLP formatter 56, in the exemplary implementation, operates to segment the received data into separate data frames, depending upon the data-type that the data forming the UDP-Lite-formatted data is determined to be. That is to say, the RLP formatter 56 receives and reassembles the data frames provided thereto on the line 38 the data-type of the data within the UDP-Lite-formatted data packet is determinative of the resultant RLP-formatted data packet generated thereat. The resultant data packets are generated on the lines 58 and are thereafter operated upon by transmit circuitry (not shown) of the base transceiver station. Then, the data packets are transmitted upon radio channels defined upon the radio link 16 and delivered to the mobile station 14.

The mobile station also forms a radio transceiver formed of a receive part 62 and a transmit part 64. When data packets are received at the mobile station and acted upon by the receive part 62, analysis is made by control circuitry 66, that is coupled to the receive part. Subsequent actions performed at the mobile station, either to request retransmission of the data packet or not to request retransmission of the data packet. And, more particularly, the control circuitry of the mobile station forming the receiving station utilizes a non-transparent procedure for sensitive data and a semi-transparent procedure for insensitive data received at the mobile station.

Because the lower-layer formatter maintains the distinction between the sensitive and insensitive data parts of a UDP-Lite-formatted data packet, the receiving station formed of the mobile station is better able to select what portions of the data packets received thereat are to be forwarded, irrespective of the number of errors contained therein and what data to request retransmission thereof.

The RLP-formatted data packet formed by the formatter 52 includes a value of the indicator generated by the indicator generator in a header portion of the data packet. The value of the header part is analyzed by the control circuitry 66, once the data packet is received at the mobile station. And, responsive thereto, the transparent, or non-transparent, procedure is selected to be carried out with respect to the data frame with insufficient quality or missing. When the data frame with insufficient quality or missing is non-sensitive data, the semi-transparent procedures are performed, retransmission of the missing data frame or the data frame with insufficient quality is requested if corresponding sensitive data in the UDP packet is not yet fully received by the mobile station. The semi-transparent procedure that selectably permits retransmission of missing data frame or the frame with insufficient quality when the sensitive data is not yet fully received increases frame quality but without introducing delay in the time required to effectuate communications. But, once the sensitive data has been received and assembled both sensitive and nonsensitive parts of the data and received non-sensitive data frame with insufficient quality are provided to an upper-layer logical layer of the mobile station, and retransmissions of the nonsensitive part of the data are not subsequently permitted.

Accordingly, at the lower-layer formatter, the indicator generator generates a value of a sensitive data indicator (SDI) and inserts the value into the header part of the resultant lower-layer data packet. An exemplary data packet 72 is shown in the Figure. And, the header part of the data packet is here shown to include the SDI, formed of an SDI field of the header part of the data packet.

In a further embodiment of the present invention, the indicator generator further generates values of a SEG_MAP_COUNT value, an FIRST value, and an SDI_MAP value. Such values are inserted into correspondingly-named fields of the header parts of the lower-layer-formatted data packet 72. The value of the SEG_MAP_COUNT is the number of data frames split from a UDP packet, a value of the FIRST value is the first frame sequence number of the UDP packet, and the value of the SDI_MAP value is a bit map identifying the sensitivity of each data frame. Other data, such as PPP framing, or other protocols, are, in the exemplary implementation, treated as being sensitive.

Figure 2:
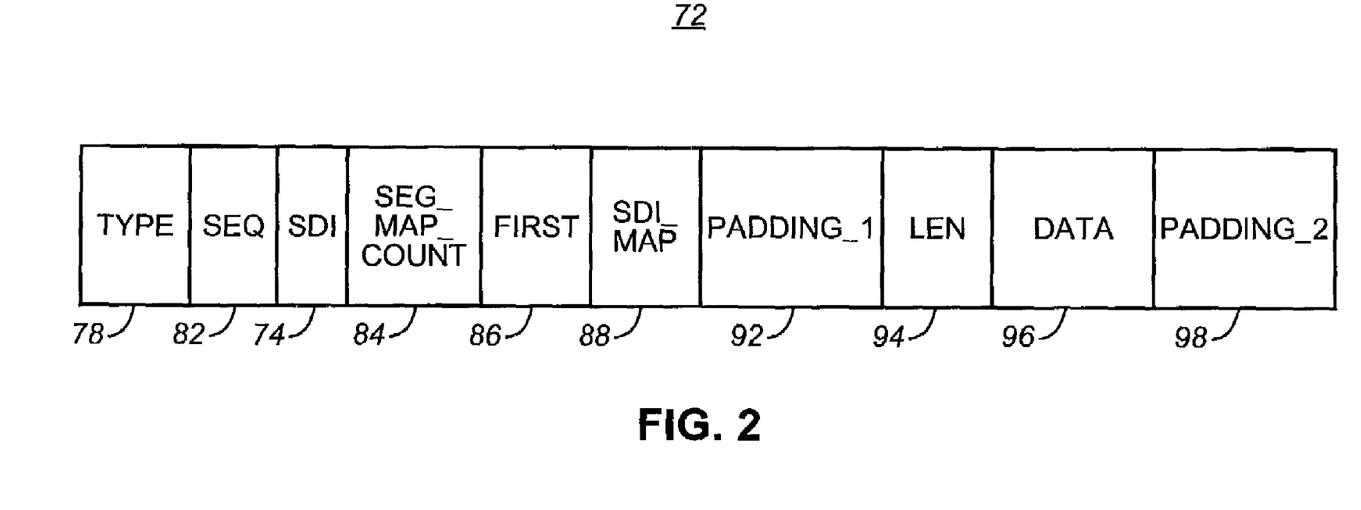
FIG. 2 illustrates a logical-layer representation of the communication system shown in FIG. 1.

FIG. 2 illustrates exemplary formatting of a lower-layer-formatted data packet 72. Here, in addition to the SDI field 74, additional fields are shown to form portions of the data packet. Namely, a TYPE field 78, a SEQ field 82, a SEG_MAP_COUNT field 84, a FIRST field 86, an SDI_MAP field 88, a PADDING_1 field 92, an LEN field 94, a data part 96, and PADDING_2 bits 98 are shown.

The TYPE field is of a two-bit length and indicates the RLP frame type. The SEQ field 82 is of an eight-bit length and indicates the least significant eight bits of the RLP data frame sequence number. The SDI field 74 is set to "1" if the sensitive data frame bit map is present and is of a logical "0" otherwise. The field 84 is of a zero or four-bit length and is of a value indicating the number of data frames segmented from a UDP-Lite-formatted data packet.

The FIRST field is of a zero or an eight-bit length and is of a value indicating the sequence number of the first frame from the UDP packet segmentation. The field 88 is of a zero or variable bit length and identifies a bit map that identifies the data frame type. The most significant bit corresponds to the data frame identified by the FIRST value. A bit set to a "1" indicates a sensitive data frame transmission. The value is set to a logical "0" for an insensitive data frame.

The PADDING_1 field is of a variable length and is populated with padding bits required to octet-align the data field. The bits of this field are set to logical "0" values. The LEN is of a eight-bit length and defines the data length in octets. The data part 96 is formed of data octets, eight times the value of the LEN value populated in the LEN field. And, the number of bits in the PADDING_2 part corresponds to the number required to fill a remainder of the frame. The bits are also of logical zero values.

The information contained in the header part of the data packet facilitates determination at the mobile station whether a retransmission request should selectively be made or whether waiting for the missing, or corrupted, frames is necessary. Depending upon the packet-size and the underlying physical-layer, frame size, the header fields can be inserted only in the first frame if the effective bandwidth reduction, due to the added header fields, is a concern.

In this implementation, the FIRST field is not needed, and the value of the SDI is set to "1" only at the first frame. In this implementation, however, the receiving station formed of the mobile station requires an additional amount of time to detect the frame-type of missing frames if the first-frame happens to be a missing frame. In this scenario, all succeeding frames are defaulted to a sensitive-type frame until the SDI is received and the state of the frame is identified. For a retransmitted frame, the sensitive data, in one implementation, is configured to have a higher priority accorded to an insensitive data frame. And, if a byte-count integrity is required at upper-layer logical layers, the RLP operates in a synchronous mode.

In an exemplary implementation, the RLP maintains two sequence number variables, $L\leq V(R)$ and $L\_V(N)$. The $L\_V(R)$ contains the expected value of the RLP frame sequence number in a subsequent data frame to be received. And, $L\_V(N)$ contains the sequence number of the next data frame needed for sequential delivery to the higher-level, logical layer.

Figure 3:
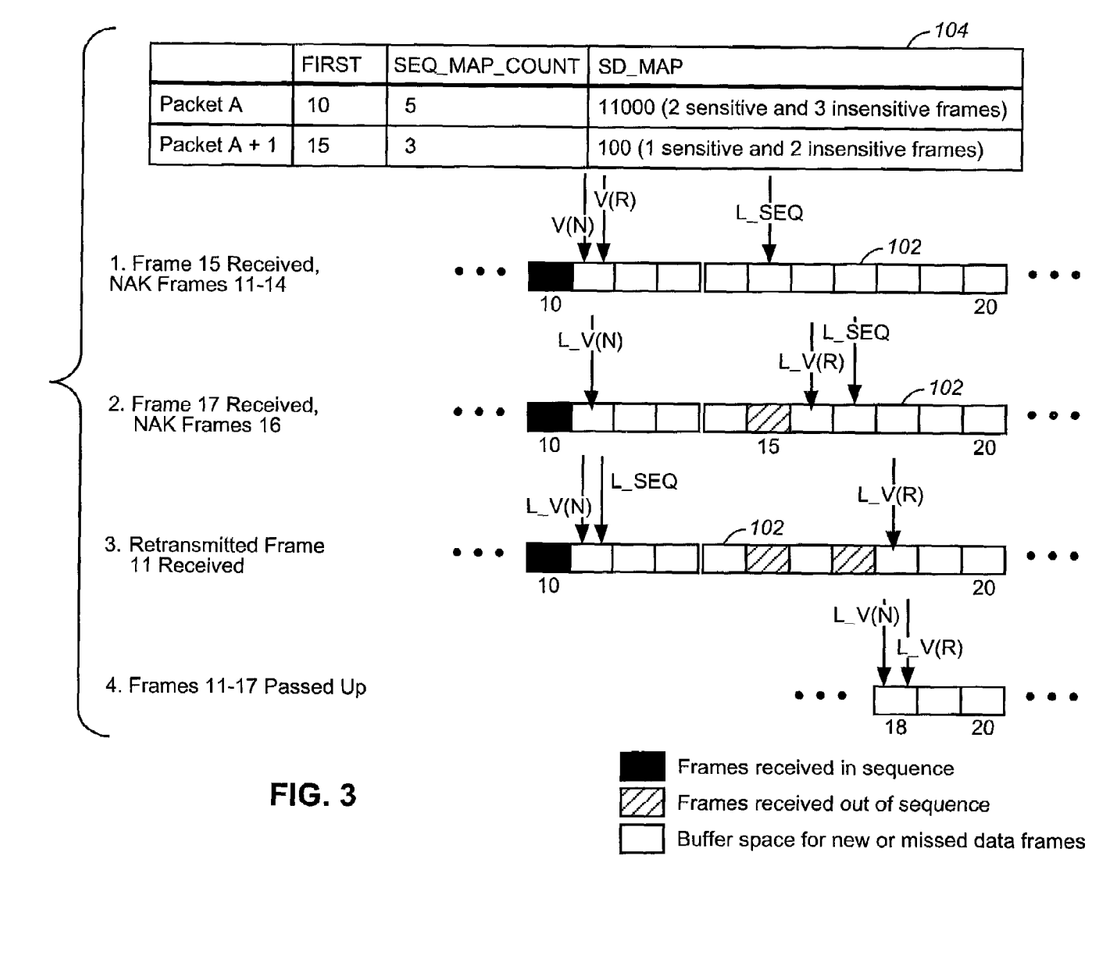
FIG. 3 illustrates the format of an exemplary lower-layer data packet generated during operation of an embodiment of the present invention.

FIG. 3 illustrates a manner by which the value of SDI is used at the mobile station during data reception. Successive frames 102 are represented in sequential positioning. And, here, frames 102 are shown. Exemplary SDI map information 104 is also shown in the Figure. The information contained in the map indicates to the mobile station that the sensitivity of all of the received and missing frames in a packet, i.e., packet A and packet A+1.

The control circuitry of the mobile station utilizes this information as a guideline for its data resequencing decisions. If the sensitive data of the UDP-Lite-formatted packet, frame numbers 10, 11, and 15 have already arrived noted at the third step, then both data packets A and A+1 are passed up to a higher-level layer, indicated by the step 4, without waiting for the retransmission of frames 12, 13, 14, and 16.

Figure 4:
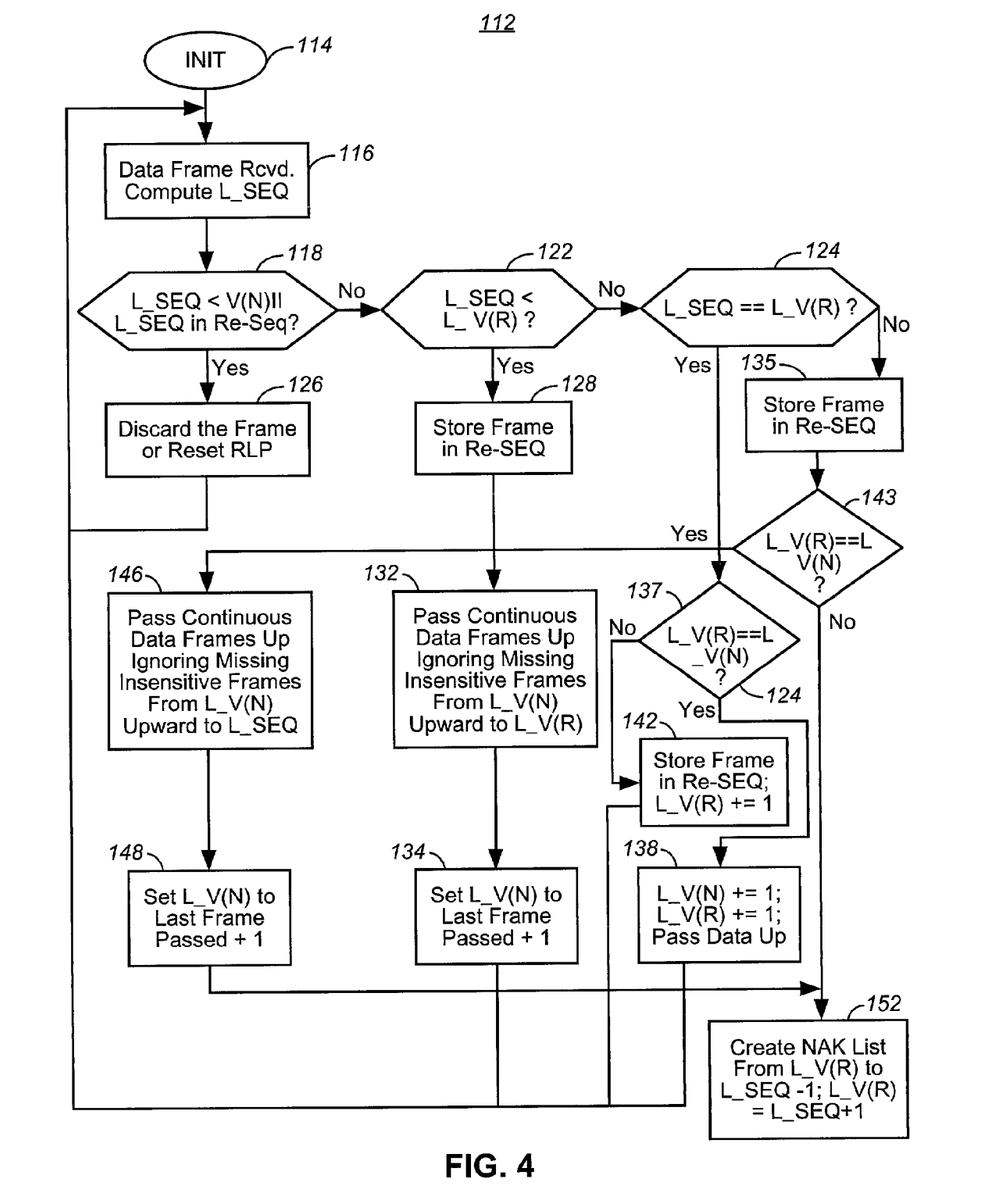
FIG. 4 illustrates a flow diagram representative of operation of a receiving station forming a portion of the communication system shown in FIG. 1 pursuant to an embodiment of the present invention.

FIG. 4 illustrates a method, shown generally at 112, represents procedures carried out by the control circuitry 66 of the mobile station shown in FIG. 1. In addition to the variables of $L\_V(R)$ and $L\_V(N)$ defined just-above, the procedure also makes reference to an L_SEQ value that is the sequence number of a received data frame and Re-SEQ that is a value of a re-sequencing buffer. Subsequent to initiation at the initiation block 114, computations are performed at the block 116. The computations are, for each valid data frame received that contains a non-zero number of octets, the value of L_SEQ is calculated. Determinations are selectably made at the decision blocks 118, 122, and 124.

Namely, if L_SEQ is less than $L\_V(N)$, the frame is discarded, indicated by the block 126, if the received frame is a retransmitted frame, or the RLP is reset if the received frame is a new frame. A branch is thereafter taken back to the block 116.

If the no branch is taken from the decision block 118, a determination is made at the decision block 122 whether the L_SEQ is less than $L\_V(R)$. If so, the yes branch is taken and the frame is stored in a re-sequencing buffer, indicated by the block 128. And, then, as indicated by the block 132, the data is passed to a higher-level logical layer in sequence number order, all of the data octets of all continuous frames in the re-sequencing buffer. Missing but insensitive data frames are ignored, from $L\_V(N)$ up to $L\_V(R)$. Then, and as indicated by the block 134, the value of $L\_V(N)$ is set to the last frame passed, incremented by one where last is equal to the sequence number of the last data frame for which all of the data octets were passed to the higher-level logical layer. Then, a branch is taken back to the block 116.

If the no branch is taken from the decision block 122 to the decision block 124, a determination is made that L_SEQ is equal to $L\_V(R)$. If not, the data (name is stored in the re-sequencing buffer, indicated by the block 135. If, however, $L\_V(R)$ is equal to $L\_V(N)$, $L\_V(N)$ is incremented, indicated by the block 138, and all of the data octets in the data frame are passed to a higher-level logical layer. A branch is then also taken back to the block 116. If, a determination is made at the block 124 that $L\_V(R)$ is not equal to $L\_V(N)$, the value of $L\_V(R)$ is incremented, indicated by the block 136, and the data frame is stored in the re-sequencing buffer. A branch is then again also taken back to the block 116. And the data frame is stored in the re-sequencing buffer. If $L\_V(R)$ is equal to $L\_V(N)$, the data is passed to the next higher layer, in sequence number order, all of the data octets in all continuous data frames in the re-sequencing buffer, ignoring missing but insensitive data frames, from $L\_V(N)$ upward to L_SEQ. And, as indicated by the block 144, an NAK list is created for each missing data frame with sequence n, number between $L\_V(R)$ and (L_SEQ-1), inclusive. Each NAK list entry contains a sequence number of one of the missing data frames. The value of L_V(R) is set to L_SEQ+1. And, a branch is taken back to the block 116.

Thereby, a manner is provided by which better to facilitate communication of data between a sending station and a receiving station in which UDP-Lite-formatting is used together with a lower-layer formatting scheme. The sensitivity-type of the formatted data, formatted at the UDP-Lite layer, is maintained at the lower-layer formatting layer. Improved communications are possible as a result.

The preferred descriptions are of preferred examples for implementing the invention, and the scope of the invention should not necessarily be limited by this description. The scope of the present invention is defined by the following claims.

What is claimed:

1. In a packet communication system having a first formatting layer operable pursuant to a first protocol and a second formatting layer operable pursuant to a second protocol, the first formatting layer for formatting data selectably into a first part and a second part, and the second formatting layer for formatting the data, subsequent to formatting thereof by the first formatting layer, an improvement of apparatus for facilitating identification at the second formatting layer of the formatting performed at the first formatting layer, said apparatus comprising:

an indicator generator operable at the second formatting layer for generating an indicator of a value representative of whether the data provided thereto, to be formatted at the second formatting layer pursuant to the second protocol, is formatted into the first part and the second part, the indicator generated at said indicator generator forming part of a second-layer data packet formed at the second formatting layer.

2. The apparatus of claim 1 wherein the first formatting layer comprises a UDP (User Datagram Protocol) Lite layer and the first protocol comprises a UDP-Lite protocol, wherein the first part into which the UDP-Lite layer selectably formats the data comprises sensitive data and the second part into which the UDP-Lite layer selectably formats the data comprises insensitive data, and wherein the indicator generated by said indicator generator in of a first value when the data provided to the second formatting layer and formatted into the second-layer data packet comprises sensitive data.

3. The apparatus of claim 2 wherein the indicator generated by said indicator generator is of a second value when the data provided to the second formatting layer, and formatted into the second-layer data packet, comprises only nonsensitive data.

4. The apparatus of claim 3 wherein the second formatting layer comprises an RLP (Radio Link Protocol) layer and the second protocol comprises an RLP protocol, and wherein the indicator generated by said indicator generator forms a portion of an RLP-formatted data packet.

5. The apparatus of claim 4 wherein said indicator generator comprises a sensitive data indicator and the indicator generated thereat comprises a sensitive data indicator, and wherein a value of the sensitive data indicator forms a portion of the RLP-formatted data packet.

6. The apparatus of claim 5 wherein the RLP-formatted data packet comprises a header part and wherein the sensitive data indicator forms a portion of the header part of the RLP-formatted data.

7. The apparatus of claim 6 wherein the UDP-Lite layer formats the data to form a UDP-Lite data packet, wherein the RLP layer forms a first data frame and at least a second data frame of the UDP-Lite data packet, and wherein said indicator generator further generates a count value, the count value of a level responsive to a count of the data frames formed at the RLP layer of the UDP-Lite data packet.

8. The apparatus of claim 7 wherein the count value forms a portion of the header part of the RLP-formatted data.

9. The apparatus of claim 8 wherein the count value is inserted in a SEQ_MAP_COUNT field of the header part of the RLP-formatted data.

10. The apparatus of claim 9 wherein the first data frame formed at the RLP layer has a sequence number associated therewith and wherein said indicator further generates a first-frame value corresponding to the sequence number associated with the first data frame.

11. The apparatus of claim 10 wherein each of the first and at least second data frames has associated therewith a sensitivity level and wherein said indicator generator further generates a representation of the sensitivity level associated with each of the data frames.

12. The apparatus of claim 11 wherein the representation comprises an SDI_MAP field of the header part of the RLP-formatted data.

13. The apparatus of claim 3 wherein the second formatting layer comprises an RLC (Radio Link Control) layer and the second protocol comprises an RLC protocol, and wherein the indicator generated by said indicator generator forms a portion of an RLC-formatted data packet.

14. The apparatus of claim 1 further comprising a segmenter coupled to receive the data, once formatted pursuant to the first protocol, selectably into the first part and the second part, said segmenter for segmenting the data received thereat into separate, second-layer data packets, data segmented by said segmenter into the separate second-layer data packets responsive to which of the first part and the second part that the data forms.

15. The apparatus of claim 14 wherein said segmenter selectably segments the data into a first-type, second-layer data packet and a second-type, second-layer data packet and wherein said segmenter segments the first part data into the first-type, second-layer data packet and segments the second part data into the second-type, second-layer data packet.

16. The apparatus of claim 15 wherein the indicator generated by said indicator generator in of a first value when forming a portion of the first-type, second-layer data packet and is of a second value when forming a portion of the second-type, second-layer data packet.

17. In a method for communicating in a packet communication system having a first formatting layer operable pursuant to a first protocol and a second formatting layer operable pursuant to a second protocol, the first formatting layer formatting data selectably into a first part and a second part, and the second formatting layer for forming the data, subsequent to formatting thereof by the first formatting layer, an improvement of a method for facilitating identification at the second formatting layer of the formatting performed at the first formatting layer, said method comprising:

providing the data, once formatted at the first formatting layer, to the second formatting layer;

determining which of the first part and the second part into which the data is selectably formatted at the first formatting layer;

generating an indicator of a value responsive to determinations made during said operation of determining; and forming a second-layer data packet at the second formatting layer, formatted pursuant to the second protocol, the second-layer data packet including a value of the indicator generated during said operation of generating.

18. The method of claim 17 further comprising the operations of:
sending the second-layer data packet to a recovery station;
analyzing the value of the indicator contained in the second-layer data packet; and
selecting whether to permit selective retransmission of the second-layer data packet responsive, in part, to the value of the indicator analyzed during said operation of analyzing.

19. The method of claim 18 wherein the selective retransmission selectively permitted responsive to said step of selecting is selectively permitted when the second-layer data packet comprises first-part data.

20. The method of claim 19 wherein the selective retransmission selectively permitted during responsive to said step of selecting is prohibited when the second-layer data packet comprises only second-part data.

* * * * *